(12) United States Patent
Cormier, Jr. et al.

(10) Patent No.: US 10,754,477 B2
(45) Date of Patent: Aug. 25, 2020

(54) CAPACITIVE PROXIMITY DETECTION SYSTEM AND METHOD

(71) Applicant: Texas Instruments Incorporated, Dallas, TX (US)

(72) Inventors: Ronald F. Cormier, Jr., Vail, AZ (US); Robert J. Stoddard, Anna, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 318 days.

(21) Appl. No.: 14/340,023

(22) Filed: Jul. 24, 2014

(65) Prior Publication Data

US 2014/0333581 A1 Nov. 13, 2014

Related U.S. Application Data

(63) Continuation-in-part of application No. 13/535,789, filed on Jun. 28, 2012, now abandoned.

(51) Int. Cl.

| | |
|---|---|
| *G06F 3/044* | (2006.01) |
| *G06F 3/041* | (2006.01) |
| *G06F 1/3234* | (2019.01) |
| *G06F 1/3287* | (2019.01) |
| *G06F 1/3231* | (2019.01) |
| *G06F 1/3215* | (2019.01) |

(52) U.S. Cl.
CPC ............ *G06F 3/044* (2013.01); *G06F 1/3215* (2013.01); *G06F 1/3231* (2013.01); *G06F 1/3265* (2013.01); *G06F 1/3287* (2013.01); *G06F 3/0418* (2013.01); *Y02D 10/153* (2018.01); *Y02D 10/171* (2018.01); *Y02D 10/173* (2018.01)

(58) Field of Classification Search
CPC ...... G06F 3/041; G06F 3/0416; G06F 3/0418; G06F 3/044; G06F 2203/04101; G06F 2203/04108
USPC .................................................. 345/173, 178
See application file for complete search history.

(56) References Cited

U.S. PATENT DOCUMENTS

| | | | |
|---|---|---|---|
| 6,323,846 B1 * | 11/2001 | Westerman | G06F 3/0235 345/173 |
| 8,228,076 B2 | 7/2012 | Cormier, Jr. et al. | |
| 8,773,146 B1 * | 7/2014 | Hills | G01N 27/22 324/658 |

(Continued)

*Primary Examiner* — Jason M Mandeville
(74) *Attorney, Agent, or Firm* — Ebby Abraham; Charles A. Brill; Frank D. Cimino

(57) ABSTRACT

A touch screen controller system for controlling a touch screen having row conductors and column conductors includes analog-digital circuitry coupled to the row conductors and column conductors to produce digital signals representative of self capacitance changes of one of the column conductors during an element proximity scanning mode and also representative of mutual changes of the touch screen during an element location scanning mode. The analog-digital circuitry indicates the influence of an element on the self-capacitance during the element proximity scanning. Proximity-determining circuitry operates on the digital signal changes during the element proximity scanning to determine if the element is proximate to the touch screen, and also to determine if the element is a specific kind of element by comparing the digital signal changes to a predetermined data profile.

10 Claims, 4 Drawing Sheets

(56) References Cited

U.S. PATENT DOCUMENTS

| | | | |
|---|---|---|---|
| 2007/0075965 A1* | 4/2007 | Huppi | H04M 1/72563 345/156 |
| 2009/0095540 A1* | 4/2009 | Zachut | G06F 3/044 178/18.03 |
| 2010/0244859 A1* | 9/2010 | Cormier, Jr. | G06F 3/044 324/678 |
| 2010/0321321 A1* | 12/2010 | Shenfield | G06F 1/3215 345/173 |
| 2011/0025629 A1* | 2/2011 | Grivna | G06F 3/0416 345/173 |
| 2013/0141339 A1* | 6/2013 | Woolley | G06F 3/0418 345/173 |
| 2013/0201151 A1* | 8/2013 | Takashima | G06F 3/044 345/174 |
| 2013/0300696 A1* | 11/2013 | Haran | G06F 3/041 345/173 |
| 2014/0002406 A1 | 1/2014 | Cormier, Jr. et al. | |

\* cited by examiner

CAPACITIVE PROXIMITY DETECTION SYSTEM AND METHOD

CROSS REFERENCE TO RELATED APPLICATION

This application is a continuation-in-part of commonly assigned patent application Ser. No. 13/535,789 filed on Jun. 28, 2012, published Jan. 2, 2014 as Pub. No. US 2014/0002406, entitled "LOW-POWER CAPACITIVE SENSOR MONITORING AND METHOD", by Ronald F. Cormier, Jr. et al, and entirely incorporated herein by reference.

BACKGROUND OF THE INVENTION

The present invention relates generally to reducing the cost of detecting a condition of close proximity of a large object, such as a human face, relative to the location of a display screen, such as a capacitive touch screen, of a mobile communication device such as a smart phone. More particularly, the present invention relates to circuitry and methods for detecting when a relatively large, somewhat conductive object, such as a human face, is in sufficiently close proximity to a touch screen display (or other display) of a cell phone, smart phone or the like to de-activate the touch screen and thereby reduce power consumption during phone conversations when touch screen functions are not needed.

Presently available cell phones, smart phones, and the like need to be able to detect when a face or other large, relatively flat object is sufficiently close or "proximate" to a touch screen (or other display) of the cell phone, smart phone, or the like in order to save power and/or prevent accidental input to a smart phone or the like due to accidental touching of the touch screen by disabling features of the touch screen. Various known touch screen architectures that are suitable for use in state-of-the-art smart phones are well known. The conventional capacitive touch screen of a smart phone typically utilizes an infrared (IR) sensor including a small IR emitter-detector diode pair to detect reflection of an emitted IR beam from the surface of a relatively large object such as a human face, as shown in Prior Art FIG. 1.

Referring to FIG. 1, a conventional state-of-the-art smart phone 1 includes a touch screen 13A which is controlled by a touch screen controller circuit and associated software. Smart phone 1 has a "proximity" detection system including an emitter-detector pair of IR diodes collectively designated by reference numerals 4A and 4B. The transmitter or emitter diode 4A emits an IR beam 6A which may be of steady intensity, but preferably is of periodic intensity to reduce power consumption. In FIG. 1, smart phone 1 is shown as being held close to, i.e., proximate to, the cheek 5 and/or ear 5A of a person having a private phone conversation. The transmitter diode 4A emits IR beam 6A, which is reflected as IR beam 6B from the ear and/or face of the person. Reflected beam 6B is detected by the detector diode of the emitter-detector IR diode pair 4A,B. If no human face or other suitably large object is proximate to IR emitter-detector pair 4A,B, then IR beam 6A either does not exist or is too weak to be detected.

If reflected beam 6B is detected, that causes associated detection circuitry in smart phone 1 to deactivate part or all of the functionality and associated circuitry of touch screen 13A as long as touch screen 13A is receiving reflected beam 6B, that is, as long as the cheek or ear of the person remains sufficiently close or proximate to emitter-detector IR diode pair 4A,B.

If the surface of touch screen 13A in FIG. 1 is in sufficiently close proximity to the user's face 5 that a speaker or sound transducer in smart phone 1 is close to (i.e., is within about an inch of) the user's face 5 or ear 5A so that the user can speak directly into the microphone of smart phone 1, then reflected IR beam 6B is detected. In this case, touch-sensing functionality is not needed so touch screen 13A is disabled or deactivated. This prevents any inadvertent touching of the touch screen from causing an unintended or accidental input to smart phone 1 while it is being held up to the cheek 5 or ear 5A. The disabling of touch screen 13A also significantly reduces the power consumption of the smart phone.

Unfortunately, the cost of using such IR sensors and associated circuitry for proximity detection of a smart phone or the like is often unacceptably high. It would be highly desirable to be able to avoid the high cost of the IR sensors and associated circuitry and nevertheless reliably achieve proximity detection of a user's face to the touch screen surface while it is being held close to the user's face.

Thus, there is an unmet need for a less costly way of determining whether a large object, such as a human face, is presently located in sufficiently close proximity to a conventional touch screen of a mobile communication device to allow some of the circuitry associated with the touch screen display to be disabled while it is being held close to the user's face and to also avoid the high cost of IR sensors and associated circuitry conventionally used for such proximity detection.

There also is an unmet need for a less costly, less power-consuming way of determining whether a large object, such as a human face, is presently located in sufficiently close proximity to a conventional touch screen of a mobile communication device to allow a portion of the circuitry associated with the touch screen to be disabled while it is being held close to the user's face and to also avoid the high cost of IR sensors and associated circuitry conventionally used for such proximity detection.

There also is an unmet need for a lower-cost, less power-consuming way to achieve detection of the proximity a user's face relative to the touch screen surface of a smart phone while it is being held close to the user's face and to also avoid the high cost of IR sensors and associated circuitry conventionally used for such proximity detection.

There also is an unmet need for a lower-cost, less power-consuming way to avoid inadvertent input signals to the smart phone from being generated by accidental touching of the touch screen surface of the smart phone while it is being held close to the user's face and to also avoid the high cost of IR sensors and associated circuitry conventionally used for such proximity detection.

SUMMARY OF THE INVENTION

Thus, it is an object of the invention to provide a less costly way of determining whether a large object, such as a human face, is presently located in sufficiently close proximity to a conventional touch screen of a mobile communication device such as a smart phone to allow at least some of the circuitry associated with the display to be disabled while it is being held close to the user's face and to also avoid the high cost of IR sensors and associated circuitry conventionally used for such proximity detection.

It is another object of the invention to provide a less costly, less power-consuming way of determining whether a large object, such as a human face, is presently located in sufficiently close proximity to a conventional touch screen of a mobile communication device such as a smart phone to allow a portion of the circuitry associated with the display to be disabled while it is being held close to the user's face and to also avoid the high cost of IR sensors and associated circuitry conventionally used for such proximity detection.

It is another object of the invention to provide a lower-cost, less power-consuming way to achieve detection of the proximity of a user's face relative to the touch screen surface of the smart phone while it is being held close to the user's face and to also avoid the high cost of IR sensors and associated circuitry conventionally used for such proximity detection.

It is another object of the invention to provide a lower-cost, less power-consuming way to avoid inadvertent input signals to a smart phone or the like from being generated by inadvertent touching of the touch screen surface of the smart phone while it is being held close to the user's face and to also avoid the high cost of IR sensors and associated circuitry conventionally used for such proximity detection.

Briefly described, and in accordance with one embodiment, the present invention provides a touch screen controller system (36-1) for controlling a touch screen (13A) having row conductors (2$i$) and column conductors (3$j$). The touch screen controller system includes analog-digital circuitry (15) coupled to the row conductors and column conductors to produce digital signals representative of self capacitance changes of a column conductor during an element proximity scanning mode and also representative of mutual capacitance changes of the touch screen during an element location scanning mode. The analog-digital circuitry indicates the influence of an element (22) on the self-capacitance during the element proximity scanning. Proximity-determining circuitry (65) operates on digital signal changes during the element proximity scanning to determine if the element is proximate to the touch screen, and also to determine if the element is a specific kind of element by comparing the digital signals to a predetermined data profile.

In one embodiment, the invention provides a touch screen controller system (36-1) for controlling a touch screen (13A) having a first number (I) of row conductors (2$i$) and a second number (j) of column conductors (3$j$), including analog-digital circuitry (15) coupled to the row conductors (2$i$) and the column conductors (3$i$) of a touch screen (13A) for producing a first digital signal (DATA) representative of a self capacitance (Cself$j$) of one of the column conductors (3$j$) during an element proximity scanning mode and also representative of mutual capacitances (Cmij) of the touch screen (13A) during an element location scanning mode, the analog-digital circuitry (15) operating to produce information representative of the influence of an element (5 in FIG. 1 or 22 in FIG. 4) on the self-capacitance (Cself$j$) during the element proximity scanning mode. Touch presence monitoring circuitry (80) operates on a second digital signal ($\Delta$DATA) representative of a change in the first digital signal (DATA) during the element proximity scanning mode to determine if the element (5,22) is touching the touch screen (13A). Specific-element proximity-determining circuitry (65) operates on the second digital signal ($\Delta$DATA) during the element proximity scanning mode to determine if the element (5,22) is proximate to the touch screen (13A), and also to determine whether the element (5,22) is a specific kind of element, e.g., face or finger, by comparing the second digital signal ($\Delta$DATA) to a predetermined data profile corresponding to the specific kind of element. In one embodiment the element is a human body part. In one embodiment the element (22) is one of a group including a portion of a human face, ear or finger.

In one embodiment, if the change ($\Delta$Cself$j$) in the self capacitance of any column conductor (3$j$) exceeds a predetermined touch threshold value, then the touch presence monitoring circuitry (80) operates to switch operation of the analog-digital circuitry (15) to the element location scanning mode.

In one embodiment, the touch presence monitoring circuitry (80) operates to continue the element proximity scanning mode by causing the analog-digital circuitry (15) to repeatedly energize an individual row conductor (2$i$) to cause the analog-digital circuitry (15) to generate values of the second digital signal ($\Delta$DATA) which represent a change in the self capacitance (Cself$j$) of any column conductor (3$j$) that is less than a predetermined touch threshold value. In one embodiment, the analog-digital circuitry (15) includes an analog-to-digital converter (17 in FIG. 2 of the '406 Published Application) which generates the first digital signal (DATA).

In one embodiment, the calibration circuitry (39,40) includes a calibration memory (39) for storing the base line data and an algebraic summer (40) for subtracting the base line data from the first digital signal (DATA).

In one embodiment, during the element location scanning mode the analog-digital circuitry (15) causes the first digital signal (DATA) to be a convoluted signal which is a function of the mutual capacitances (Cmij) of at least a plurality of the row conductors (2$i$).

In one embodiment, the processing circuit (44) includes a de-convolution circuit (44) which operates on the second digital signal (DATA) by solving a plurality of equations that represent the mutual capacitances as functions of the amounts and polarities of charge transferred to a first column conductor (3$j$) and corresponding voltage components produced on the first column conductor in order to produce the third digital signal (58).

In one embodiment, the analog-digital circuitry (15) operates to superimpose charge transfers from mutual capacitances (Cmij) of at least the plurality of the row conductors (2$i$) to a second column conductor to cause a corresponding portion of the first digital signal (DATA) to be a convoluted signal which is a function of the mutual capacitances (Cmij) of at least the plurality of row conductors (2$i$).

In one embodiment, a processing circuit (44) operates on the second digital signal ($\Delta$DATA) during the element location scanning mode to produce a third digital signal (58) which represents a magnitude map of element induced mutual capacitance change values ($\Delta$Cmij).

In one embodiment, a touch detection circuit (50) is coupled to receive the third digital signal (58) for repeatedly detecting and storing updated values of a first maximum magnitude capacitance variable and associated row and column locations to determine the location of a maximum magnitude mutual capacitance change ($\Delta$Cmij) caused by a present touch on the touch screen (13A).

In one embodiment, the de-convolution circuit (44) stores an inverse matrix ($J^{-1}$) representing coefficients of a plurality of equations that represent the mutual capacitances (Cmij) as functions of the amounts and polarities of charge transferred to the first column conductor (3$j$) and the corresponding voltage components produced on the first column conductor, and multiplies the inverse matrix ($J^{-1}$) by a vector matrix representing values of the second digital data signal ($\Delta$DATA) obtained for each of the mutual capacitances (Cmij) to obtain the values of the third digital signal (58) representing the magnitude map of the touch capacitance change values (ΔCmij).

In one embodiment, calibration circuitry (39,40) is coupled to receive the first digital signal (DATA) for calibrating the first digital signal (DATA) with respect to base line data representing neutral values of the self capacitances (Cselfj) during the element proximity scanning mode and for calibrating the first digital signal (DATA) with respect to base line data representing neutral values of the mutual capacitances (Cmij) during the element location scanning mode to produce a second digital signal (ΔDATA) which may represent either element proximity induced self-capacitance change values (ΔCselfj) during the element proximity scanning mode or element location induced mutual capacitance change values (ΔCmij) during the element location scanning mode. In one embodiment, the touch screen panel includes 10 rows and 6 columns.

In one embodiment, the invention provides a method for operating a touch screen controller (36-1), including producing a first digital signal (DATA) representative of a self capacitance (Cselfj) of a column conductor (2j) of a touch screen (13A) during an element proximity scanning mode and also representative of mutual capacitances (Cmij) of the touch screen (13A) during an element location scanning mode; operating on a second digital signal (ΔDATA) representative of a change in the first digital signal (DATA) during the element proximity scanning mode to determine proximity of the element (e.g., face 5 or finger 22) relative to the touch screen (13A); and operating on the second digital signal (ΔDATA) during the element location scanning mode to determine if the element (5,22) is proximate to the touch screen (13A) and also to determine whether the element (5,22) is a specific kind of element, e.g., face or finger, by comparing the second digital signal (ΔDATA) to a predetermined data profile corresponding to the specific kind of element.

In one embodiment, the method includes continuing to operate in the element proximity scanning mode by causing analog-digital circuitry (15) to repeatedly energize an individual row conductor (2i) of the touch screen (13A) at a relatively slow rate to cause the analog-digital circuitry (15) to generate values of the second digital signal (ΔDATA) which represent a change in the self capacitance (Cselfj) of any column conductor (3j) of the touch screen (13A) that is less than a predetermined threshold value.

In one embodiment the method includes initiating operation in the element location scanning mode if the change (ΔCselfj) in the self capacitance of any column conductor (3j) exceeds a predetermined touch threshold value.

In one embodiment the method includes generating the first digital signal (DATA) during the element location scanning mode as a convoluted signal which is a function of the mutual capacitances (Cmij) of at least a plurality of the row conductors (2i).

In one embodiment, the invention provides a touch screen controller (36-1) including means (15) for producing a first digital signal (DATA) representative of a self capacitance (Cselfj) of a column conductor (2j) of a touch screen (13A) during an element proximity scanning mode and also representative of mutual capacitances (Cmij) of the touch screen (13A) during an element location scanning mode; means (80) for operating on a second digital signal (ΔDATA) representative of a change in the first digital signal (DATA) during the element proximity scanning mode to determine proximity of the element (5, 22) relative to the touch screen (13A); and means (65,80) for operating on the second digital signal (ΔDATA) during the element location scanning mode to determine if the element (5,22) is proximate to the touch screen (13A) and also to determine whether the element (5 in FIG. 1 or 22 in FIG. 4) is a specific kind of element by comparing the second digital signal (ΔDATA) to a predetermined data profile corresponding to the specific kind of element.

DETAILED DESCRIPTION OF THE PREFERRED EMBODIMENTS

Figure 4:
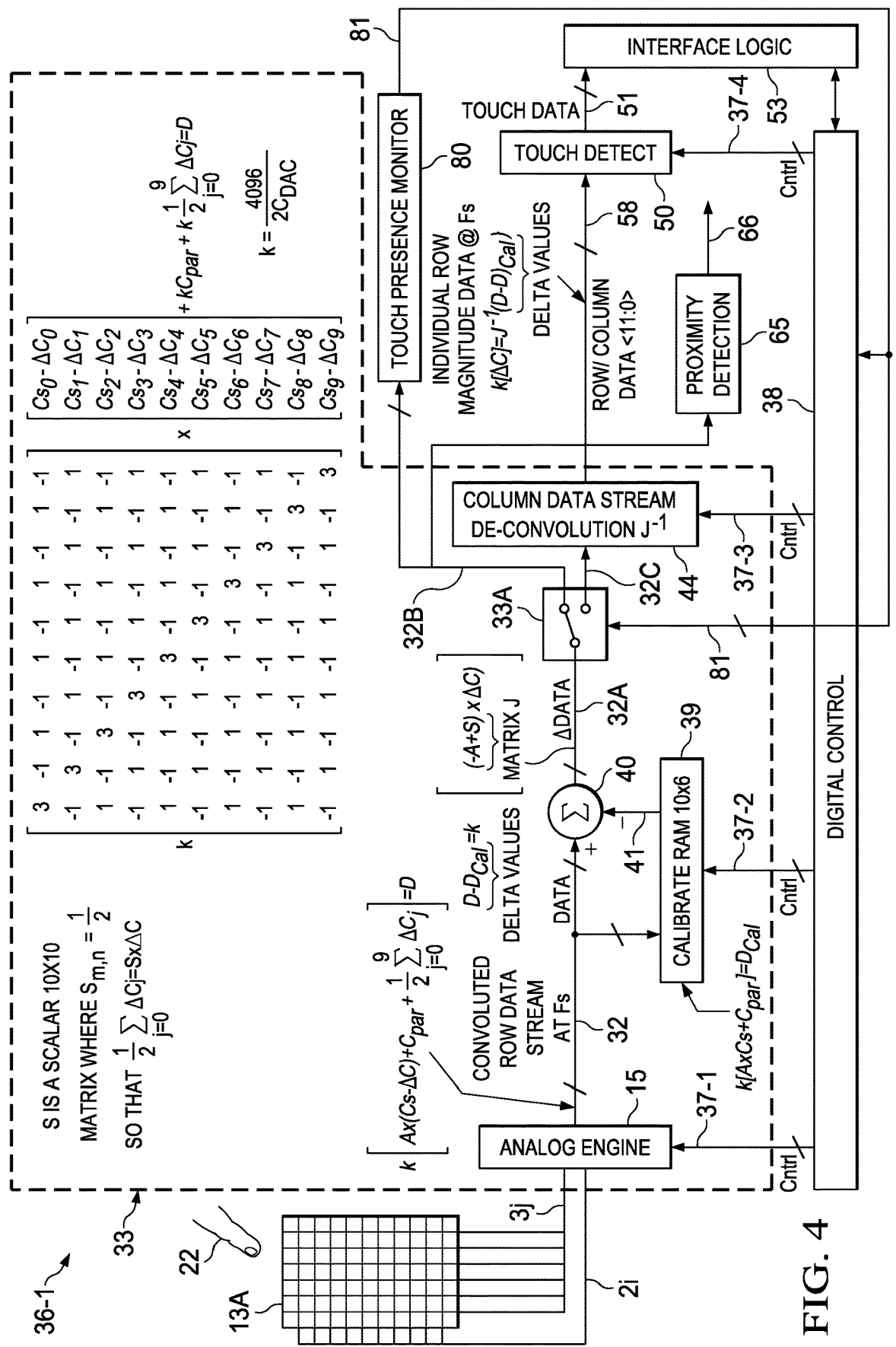
FIG. 4 is a block diagram illustrating a touch screen and touch screen controller system for processing the algorithm of FIGS. 2 and 3 in and for also operating to determine the location of a present on the touch screen.

As explained in the above commonly assigned and incorporated-by-reference patent publication US 2014/0002406 (hereinafter referred to as "the '406 published patent application"), the change ΔCselfj in self capacitance of the columns of touch screen 13A in subsequently described FIG. 4 is highly sensitive with respect to a finger touch or to the presence or proximity of a face/cheek or other body part (or other sufficiently conductive element) that is adjacent to or "proximate" to, i.e., sufficiently close to, touch screen 13A. Therefore, the proximity of the cheek/face may be detected when the cheek/face is located within roughly an inch of the touch screen surface. The same circuitry used for detecting the presence of a touch on the surface of touch screen 13A as described with reference to FIG. 5 in the '406 published patent application is also entirely included in subsequently described FIG. 4 herein, and that same circuitry can also be used to help detect "proximity" of a relatively large and sufficiently conductive object or body part relative to touch screen 13A. The "proximity detection" described herein of a relatively large, somewhat conductive object such as a human cheek differs from the "touch presence monitoring" described in the '406 published patent application in that ΔDATA therein is interpreted differently.

In the example of the "touch presence monitoring" operating mode described in the '406 published patent application, the presence of a valid touch on screen 13A (FIG. 4 herein) is detected if the change in self capacitance ΔCselfj of any column 3j of touch screen 13A exceeds a single predetermined threshold. (The self capacitance Cselfj of a column conductor 3j is its total parasitic capacitance to ground and/or other reference voltage). If the presence of a valid touch is detected, then the "full panel scanning" operating mode is initiated to determine the precise location of the detected valid touch.

However, in the case of "proximity detection" of a face, cheek, or ear which is sufficiently close to touch screen 13A, the above-mentioned single predetermined threshold is not necessarily used. Instead, changes in self capacitance ΔCselfj of one or more columns are analyzed to determine whether or not the "profile" of a predetermined pattern of ΔCselfj values represents a suitable "in-proximity" location or closeness to touch screen 13A of an approaching, somewhat conductive object that is sufficiently large and also sufficiently "flat" or "non-pointed" that the approaching object is part of a human face (e.g., a face or ear).

In the event that the face or cheek is in fact proximate to touch screen 13A, a suitable "in-proximity" signal is generated and utilized to trigger a particular desired result, such as disabling the touch screen 13A to reduce power consumption and/or to avoid unintended inputs to the smart phone. (Hysteresis may be introduced to maintain the status of the proximity detection of a face or other large object if, for example, the face or other object moves away and a finger touches touch screen 13A.) Generally, the presence of a predetermined profile of relatively large ΔCselfj values is interpreted to distinguish the difference between a face and finger and indicate proximity of a face/cheek or ear relative to touch screen 13A.

Subsequently described FIG. 4 includes touch screen 13A and a touch screen controller 36-1 in which a face, cheek, or ear proximity detection algorithm 65 that is operated according to the present invention. However, the flow charts of two implementations of the proximity detection algorithm will first be described with reference to FIGS. 2 and 3 before describing FIG. 4.

Figure 2:
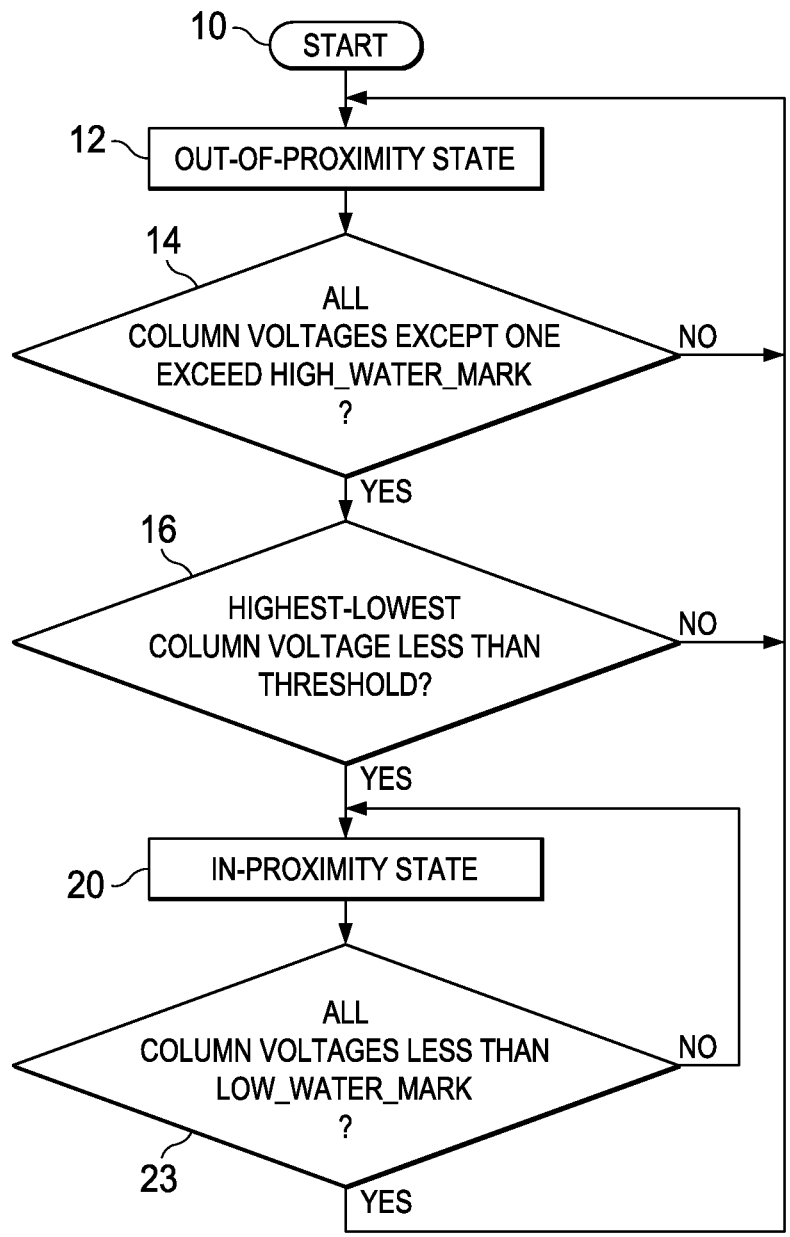
FIG. 2 is a simplified flowchart of an algorithm for detecting proximity of a human face relative to the surface of the touch screen of a smart phone.

Referring now to FIG. 2, the illustrated proximity detection algorithm is utilized as a two-state system with conditions that control transitions between the two states. One of the two states is referred to as the "in-proximity state" indicated in block 20, wherein the user's face or cheek or ear is located closer than roughly an inch from the surface of touch screen 13A (FIG. 4). The other state is referred to as the "out-of-proximity state" indicated in block 12, wherein the user's face or ear is located more than roughly an inch away from touch screen 13A.

Starting from label 10 in FIG. 2, the proximity detection algorithm initially assumes the out-of-proximity condition indicated in block 12. From block 12, the proximity determination algorithm goes to decision block 14 and determines whether all of the touch screen column conductors $3j$ (wherein $0<j \le$ number of column conductors in touch screen 13A or, depending upon system sensitivity requirements, whether all except one of the column conductors $3j$) in FIG. 4 are at a voltage value above a predetermined column conductor voltage value referred to as the "HIGH_WATER_MARK". In either case, if the determination of decision block 14 is negative, the proximity algorithm returns to the out-of-proximity state of block 12 and continues operating at a predetermined rate.

Figure 1:
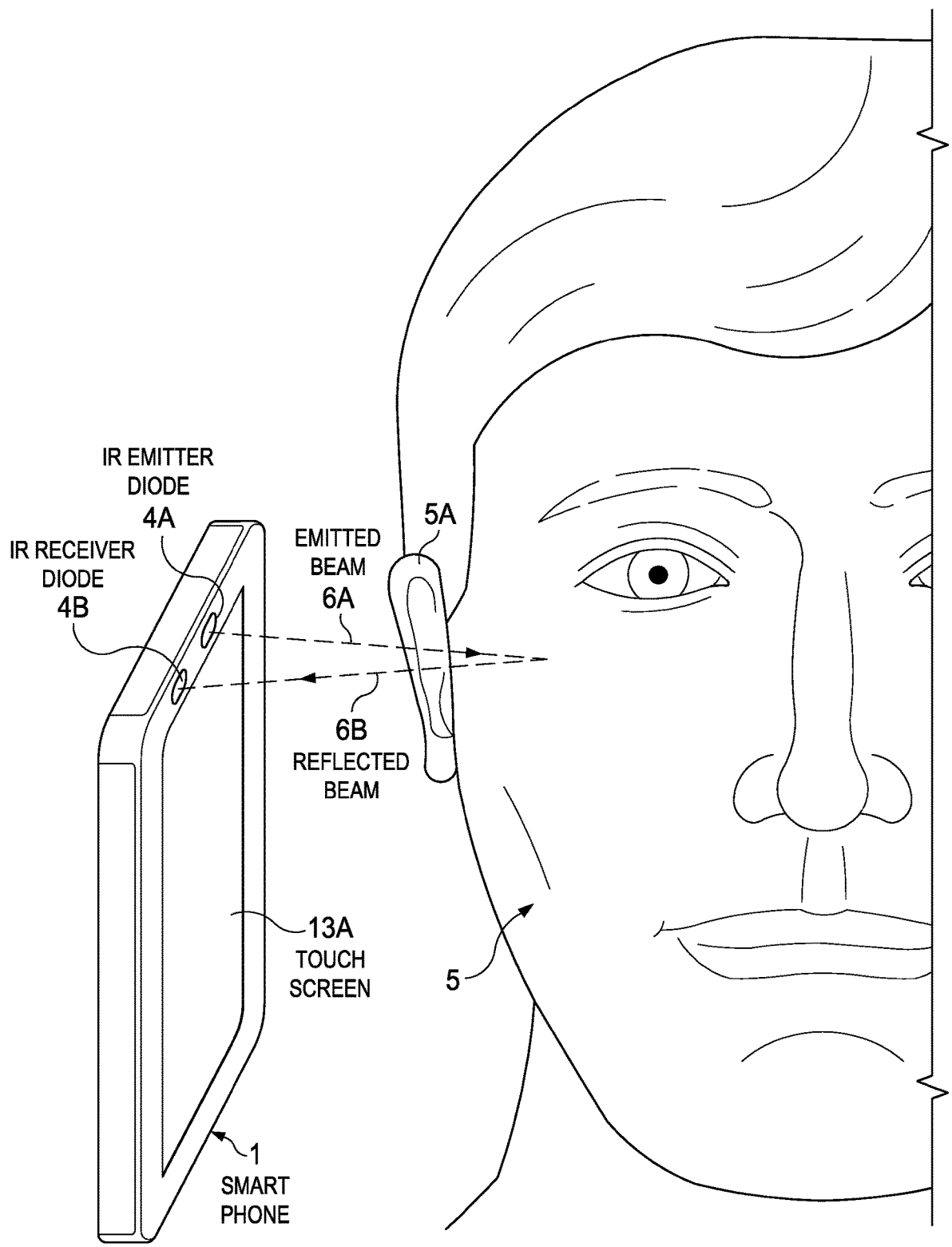
FIG. 1 is a diagram illustrating a conventional way of detecting proximity of the human face relative to the surface of the touch screen of a smart phone using an emitter-detector IR diode pair.

The proximity detection algorithm needs to be able to reliably distinguish a relatively small, somewhat pointed human finger from a relatively large and relatively flat human face or cheek or ear. The above-mentioned "HIGH_WATER_MARK" test of decision block 14 in FIG. 2 (and FIG. 3) responds to a somewhat conductive object that is approaching touch screen 13A (FIGS. 1 and 4) and is sufficiently close to touch screen 13A to be recognized by the proximity detection algorithm. The value previously established for the voltage value HIGH_WATER_MARK may be slightly greater than what might be called the "system noise" of touch screen controller 36-1. Therefore, decision block 14 attempts to overcome the system noise, and attempts to recognize whether the approaching object is likely to be relatively large by requiring the voltage of all, or nearly all, of the touch screen column conductors $3j$ to exceed the pre-established upper threshold value HIGH_WATER_MARK. The number of column conductors $3j$ not required by decision block 14 to exceed the voltage threshold HIGH_WATER_MARK is selected so as to increase the "safety margin" above the system noise.

If the determination of decision block 14 is affirmative, the algorithm goes to decision block 16 and determines whether the voltage of the highest-voltage column conductor $3j$ minus the voltage of the lowest voltage column conductor $3j$ is less than a predetermined threshold. If the determination of decision block 16 is negative, i.e., if the frontal profile of an approaching object is not suitably "flat", the proximity detection algorithm returns to the out-of-proximity state of block 12 and continues normal operation. If the determination of decision block 16 is affirmative, this means the frontal profile of the approaching object is "sufficiently flat", and the proximity detection algorithm goes to the in-proximity state indicated in block 20. Thus, decision block 16 involves comparing the highest touch screen column voltage value and the lowest touch screen column voltage value in order to determine whether the approaching object is a relatively large, flat object such as a human cheek or the like, and is not a relatively small, pointed object such as a human finger.

For example, the touch screen column profile tends to assume a somewhat triangular profile in response to the tip of a human finger approaching touch screen 13A, wherein the finger point closest to the touch screen 13A causes the nearest touch screen conductor $3j$ to have the highest voltage value, and other touch screen conductors $3j$ closest to other parts of the finger have lower voltage values. As the approaching finger tip actually touches touch screen 13A, all of the column conductor voltage values will be greater than the value HIGH_WATER_MARK.

Once the proximity detection algorithm is in the in-proximity state of block 20, it goes to decision block 23 and determines if the voltages of all of the touch screen column conductors $3j$ are less than a predetermined threshold voltage equal to the value "LOW_WATER_MARK". If the determination of decision block 23 is affirmative, the proximity detection algorithm returns to out-of-proximity state of block 12. If the determination of decision block 23 is negative, the algorithm returns to the in-proximity state of block 20 and continues operation.

When the proximity detection algorithm of FIG. 2 is testing to determine whether or not to go into the in-proximity state in block 20, it performs the tests of decision blocks 14 and 16 quite rapidly, for example, 50 times per second. The proximity detection algorithm performs the tests of decision block 23 more slowly, for example, 2 to 4 times per second, in order to reduce power consumption.

The following values were used in a demonstration unit including the proximity detection algorithm of FIG. 2:

HIGH_WATER_MARK=12
LOW_WATER_MARK=10
COL_TOO_HIGH=100
COLUMN_DELTA=40.

Note that these values were obtained through experimentation, and depend greatly upon the specific device mechanics and the configuration of the touch screen controller. Therefore, various different smart phone devices may require different settings than those indicated above.

It should be appreciated that the order in which the basic tests of decision blocks 14 and 16 are performed could be reversed.

Figure 3:
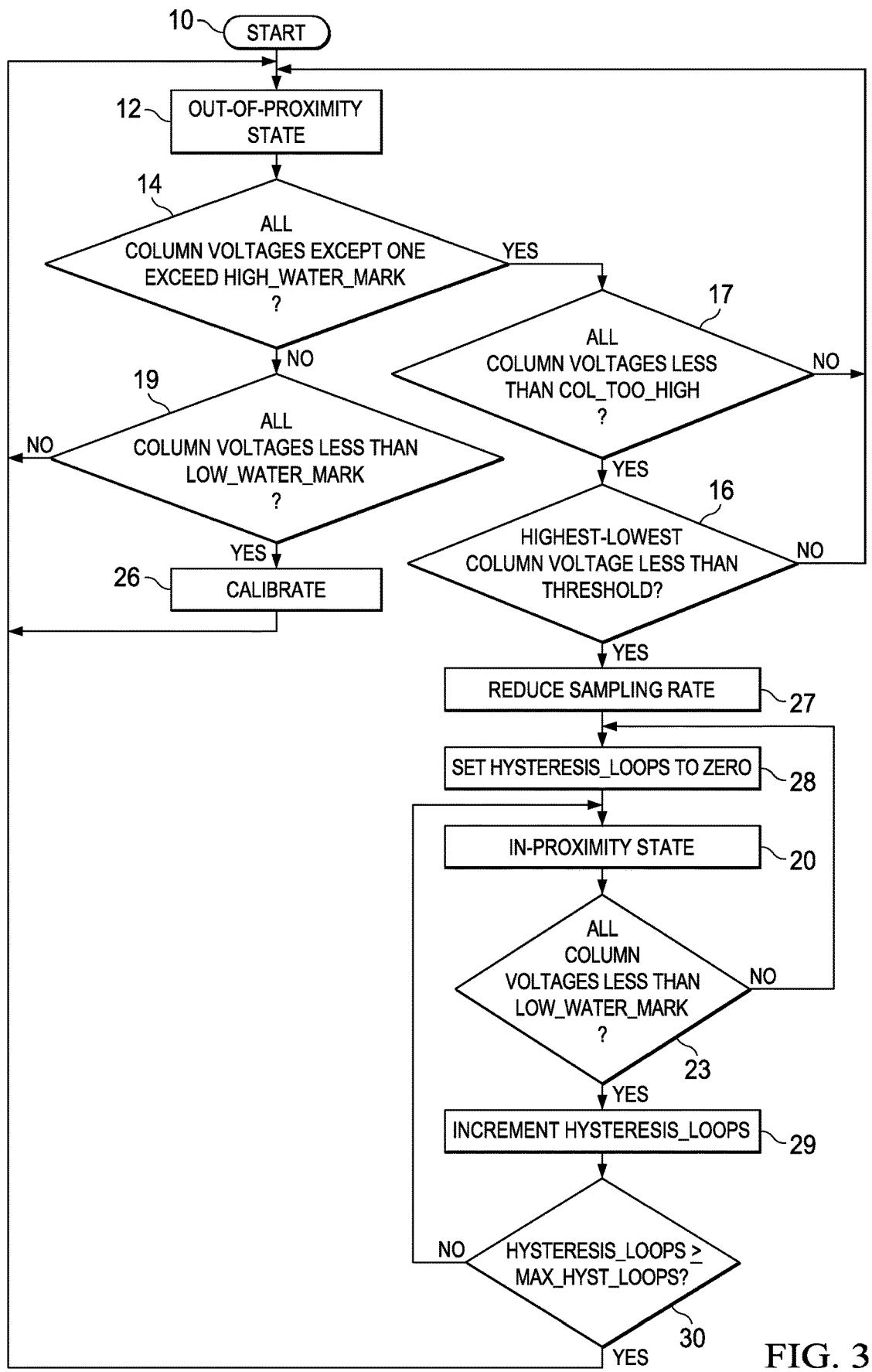
FIG. 3 is a more detailed variation of the flowchart of FIG. 2.

Referring next to the more detailed flowchart in FIG. 3, and starting from label 10, the proximity detection algorithm initially assumes the out-of-proximity condition indicated in block 12. From block 12, the proximity determination algorithm goes to decision block 14 and determines whether all of the touch screen column conductors $3j$ (wherein $0<j\leq$number of column conductors in touch screen 13A or, depending upon system sensitivity requirements, whether all except one of the column conductors $3j$) in FIG. 4 are at a voltage value above a predetermined voltage value referred to as the "HIGH_WATER_MARK". If the determination of decision block 14 is negative, the proximity algorithm goes to decision block 19 and determines if all column voltages are less than a value LOW_WATER_MARK. If the determination of decision block 19 is negative, the proximity algorithm returns to the out-of-proximity state of block 12 and continues operating at a predetermined rate. If the determination of decision block 19 is affirmative, the proximity algorithm goes to block 26 and calibrates the self-capacitance values ΔCselfj. In block 26, the proximity algorithm computes a value NEW_CAL_VALUE=PREVIOUS_CAL_VALUE+(CURRENT_SAMPLE_VALUE minus PREVIOUS_CAL_VALUE)/100. Then, on a per-sample basis, the present calibration value is subtracted from the previous column conductor voltage value before each of the tests of decision blocks 14, 17, 19, and 23 is accomplished. This essentially continuous calibration technique provides a suitably slow adjustment to accommodate any on-going environmental effects. The calibration is performed essentially continuously because the required sensitivity of the proximity detection algorithm is much higher than the touch detection technique subsequently described with reference to FIG. 4.

As mentioned earlier, the proximity detection algorithm needs to be able to reliably distinguish a relatively small, somewhat pointed human finger from a relatively large and relatively flat human face or cheek or ear. The above-mentioned "HIGH_WATER_MARK" test of decision block 14 in the examples of FIGS. 2 and 3 responds to a somewhat conductive object that is approaching touch screen 13A (FIGS. 1 and 4) and is sufficiently close to touch screen 13A to be recognized by the proximity detection algorithm. As mentioned earlier with reference to FIG. 2, the value previously established for voltage value HIGH_WATER_MARK may be slightly greater than what might be called "system noise" of touch screen controller 36-1. Therefore, decision block 14 attempts to overcome the system noise, and attempts to recognize whether the approaching object is likely to be relatively large by requiring the voltage of all, or nearly all, of the touch screen column conductors $3j$ to exceed the pre-established upper threshold value HIGH_WATER_MARK. The number of column conductors $3j$ not required by decision block 14 to exceed the voltage threshold HIGH_WATER_MARK is selected so as to "increase the "safety margin" above the system noise. This may be desirable if the system noise is large enough to be capable of causing any of column conductors $3j$ to assume a high or low voltage level. If that is the case, allowing one or a small number of column conductors $3j$ to skip the "HIGH_WATER_MARK" test of decision block 14 may be necessary.

If the determination of decision block 14 is affirmative, the algorithm goes to decision block 17 and determines whether or not the highest column conductor voltage is greater than a predetermined value COL_TOO_HIGH. This is desirable because otherwise at some point a finger approaching touchscreen 13A will "saturate" the touch-screen conductor voltages and thereby reduce the "sharpness" of the column conductor voltage profile and cause the proximity detection algorithm to conclude that the user's face is proximate to touch screen 13A. Thus, an affirmative determination by both of decision blocks 14 and 17 means that all column conductor voltages except one are between the COL_TOO_HIGH and HIGH_WATER_MARK values. If the determination of decision block 17 is negative, the algorithm returns to out of-of-proximity block 12, and if the determination of decision block 17 is affirmative, the algorithm goes to decision block 16. A negative determination by decision block 16 may prevent the undesirable effect of a large finger having a sufficiently flat profile to be mistaken for a relatively flat face.

Decision block 16 determines whether the voltage of the highest-voltage column conductor $3j$ minus the voltage of the lowest voltage column conductor $3j$ is less than a predetermined threshold. If the determination of decision block 16 is negative, i.e., if the frontal profile of an approaching object is not suitably "flat", the proximity detection algorithm returns to the out-of-proximity state of block 12 and continues normal operation. Generally, the presence of a predetermined profile of relatively large ΔCselfj values is interpreted to indicate proximity of a face/cheek or ear relative to touch screen 13A and to distinguish the difference between a face and finger.

If the determination of decision block 16 is affirmative, this means the profile of the approaching object is "sufficiently flat". In this case, the proximity detection algorithm goes to block 27 and reduces the sampling rate at which at which the tests of decision blocks 23 and 30 are performed. (This substantially reduces the repetition rate at which the tests of decision blocks 23 and 30 are performed in order to reduce the power drain of the smart phone during a phone call. For example, it may be prudent to lower the repetition rate from performing the sample testing on 30 to 60 samples per second during proximity testing to performing the testing approximately one sample every half second during an ongoing phone call. Typically, the smart phone is in an "awake" state much of the time, for example while a phone call is occurring. Consequently, the operation of block 27 can greatly reduce the overall power consumption of the smart phone.)

Next, the algorithm goes to block 28 and sets the value HYSTERESIS_LOOPS. Hysteresis determined by the value HYSTERESIS_LOOPS may be introduced to maintain the status of the proximity detection of a face or other large object if, for example, the face or other object moves away and a finger touches 13A. Such "hysteresis" may be accomplished by running the test a number of times (e.g., 3 times) and expecting an "out-of-proximity" result each time (or N−1 times within an N-sample set if it is suitably large) before changing state.

Thus, decision block 16 involves comparing the highest touch screen column voltage value and the lowest touch screen column voltage value in order to determine whether the approaching object is a relatively large, flat object such as a human cheek or the like, and is not a relatively small, pointed object such as a human finger. As previously mentioned, the touch screen column profile tends to assume a somewhat triangular profile in response to the tip of a human finger approaching touch screen 13A, wherein the finger point closest to the touch screen 13A causes the nearest touch screen conductor $3j$ to have the highest voltage value, and other touch screen conductors $3j$ closest to other parts of the finger have lower voltage values. As the approaching finger tip actually touches touch screen 13A, all of the column conductor voltage values will be greater than the value HIGH_WATER_MARK.

In the event that the face or cheek is in fact proximate to touch screen 13A, then a suitable "in-proximity" signal is generated on the output 66 of proximity detection circuit 65 in FIG. 4 and utilized to trigger a particular desired result, such as disabling the touch screen 13A to reduce power consumption and/or to avoid unintended inputs to the smart phone. The proximity detection algorithm goes from block 28 to the in-proximity state of block 20, and then goes to decision block 23 and determines if the voltages of all of the touch screen column conductors $3j$ are less than a predetermined threshold voltage equal to the value "LOW_WATER_MARK".

If the determination of decision block 23 is affirmative, the proximity detection algorithm goes to block 29 and increments the value HYSTERESIS_LOOPS. The algorithm then goes to decision block 30 and determines if HYSTERESIS_LOOPS is greater than or equal to a maximum value MAX_HYST_LOOPS. If the determination of decision block 30 is negative, the proximity detection algorithm returns to the in-proximity state of block 20, but if the determination of decision block 30 is affirmative, the algorithm may return to out-of-proximity block 12, and if the determination of decision block 23 is negative, the algorithm returns to in-proximity block 20.

It should be appreciated once the smart phone or the like has entered its "in-proximity" state, the tests required to enter that state no longer have to apply. It may be advantageous for it to be somewhat difficult for the smart phone to enter into its "in-proximity" state and also somewhat difficult for it to return to its "out-of-proximity" state simply because of the somewhat complex and uncertain nature of the physics and the human nature involved in this problem.

It should be understood that various proximity detection algorithms as generally described herein may be implemented in the form of software executed by using a suitable processor, firmware, and/or dedicated circuitry. The processor utilized could be a dedicated processor which executes the proximity detection algorithm software to achieve the function of proximity detection block 65 of subsequently described FIG. 4, or the processor could be one which also performs the functions of various other blocks in FIG. 4.

FIG. 4 includes all of the material in FIG. 5 of the '406 published patent application. Another related commonly assigned Published Patent Application Pub. No. 2010/0244859 ("the '859 published patent application") discloses a touch screen controller system 36 which includes an analog/digital "Analog Engine" circuit 15. More details of one implementation of analog engine circuit 15 in FIG. 4 are shown in FIGS. 2A-2D of the '859 published patent application, wherein engine 15 is operated so as to accomplish a "convolution" or combining of all of the mutual capacitances $C_{SENij}$ (which are referred to as "mutual capacitances Cmij) between all of the rows $2i$ (where, for example, $0 \leq I \leq 9$) and any particular column $3i$ (where, for example, $0 \leq j \leq 5$) of touch screen panel 13A into a column signal generated on a corresponding column conductor $3j$. The convolution is accomplished by means of the "3q" charge packet transfer procedure described in the '859 published patent application. A change $\Delta$Cmij in the mutual capacitance between a row conductor $2i$ and a column conductor $3j$ of touch screen panel 13A is caused by the presence of a finger touch (or suitable conductive stylus, etc.) on or very close to that mutual capacitance. The resulting column signal is digitally "de-convoluted" by means of a de-convolution algorithm performed in block 44 to obtain a signal representing an amount of charge transferred from a particular one of the mutual capacitances Cmij to the column conductor $3j$.

The matrix equation in FIG. 4 represents a process by which convoluted digital data D is generated within analog engine 15. Dashed line 33 encircles the system components that produce the convoluted digital data D and from it produce de-convoluted data which is utilized to determine the location of the present touch on panel 13A. The inverse matrix $A^{-1}$ of the matrix illustrated FIG. 4 is multiplied by the matrix $C_S - \Delta C$ to produce the values of each of the mutual capacitances of the entire described 10 row by 6 column touch screen panel. The output signal D (i.e., DATA) produced on digital bus 32 in FIG. 1 by analog engine 15 is applied to the (+) input of a digital summer 40. The output signal D on bus 32 may be represented by the matrix expression $$k[A \times (C_S - \Delta C) + C_{par} + \tfrac{1}{2} \Sigma_{j=0}^{9} \Delta C_j] = D,$$

where A is the square left matrix, $C_S$ is a matrix or vector including mutual capacitances Cm0, 1 ... 9, $\Delta C$ is an unknown quantity to be solved for, $C_{par}$ is a constant parasitic capacitance, and k is equal to $4096/2C_{DAC}$, where $C_{DAC}$ is the capacitance of CDAC 23 in FIG. 2A of the '859 application.

To determine where a touch has occurred on panel 13A, the signal D on bus 32 must first be "calibrated" by taking a measurement of each mutual capacitance node on a column. This initial data stream is represented by the equation $$k[A \times C_S + C_{par} + 0] = D_{Cal}.$$

Subsequent values of data, which are produced at the output of algebraic summer 40, are compared to this baseline to obtain $\Delta$Cmij values, or "delta" values. These values are represented by the equation $$k[-A + \Delta C + \tfrac{1}{2} \Sigma_{j=0}^{9} \Delta C_j] = D - D_{Cal}.$$

The term "½" in the foregoing expression is a function of the particular panel being analyzed. The present analysis assumes that when a touch occurs, ½ of the $\Delta C$ charge is shunted to the "row side", while the other ½ of the $\Delta C$ charge is shunted to the "column side". However, in a different panel the term "½" could be replaced by a different fractional value. The largest delta value obtained from a full scan of touch panel 13A represents the "strongest" touch, the location of which is determined as subsequently explained. The "baseline" or neutral values for all mutual capacitances Cmij obtained from the initial scan of touch panel 13A with no finger touches thereon are stored in calibration memory 39.

The output 41 of calibration memory 39 is applied to the (−) inputs of summer 40, the (+) inputs of which receive the convoluted raw data signal D on bus 32. During normal operation, the baseline data values stored in calibration memory 40 are subtracted from corresponding present values of data output D by analog engine 15 by means of digital algebraic summer 40 to generate the "calibrated" data stream $\Delta$D (i.e., $\Delta$DATA) representing changes $\Delta$Cmij of any mutual capacitance influenced by the presence of a finger. (Thus, during normal operation, if no finger touches are present on panel 13A, the output of digital summer 40 consists of all "0"s.) The raw data generated by analog engine 15 is always stored in calibration memory 39 and the calibration methodology for accomplishing this is described in the '859 application.

The calibrated output data stream $\Delta$D of algebraic summer 40 is represented by the expression $$D - D_{Cal} = k[(-A + S) \times \Delta C],$$

where $D_{Cal}$ represents the "non-touch" raw data panel values, and is stored in an array in calibration RAM 39 (which is a 10×6 array in the above example) and is subtracted from the data D obtained by scanning touch screen panel 13A, so that a non-touch condition for any node or mutual capacitance is representative of a zero value of the corresponding data at the output of summer 40, such that a touch condition at that mutual capacitance node is represented by a non-zero value. The absence of any touch is indicated by zero values on all mutual capacitance nodes.

The data stream produced on bus 32A is applied to the input of column data "de-convolution" circuit 44. De-convolution circuit 44 is controlled by signals produced on bus 37-3 by digital control circuit 38. The digital output of de-convolution circuit 44 is produced on digital bus 58, and can be represented by the expression $$k[\Delta C] = \mathcal{J}^{-1}(D - D_{Cal})$$

This signal on bus 58 is applied to the input of a touch detection circuit 50 which is controlled by signals produced on bus 37-4 by digital control circuit 38. The "touch location" data produced by touch detection circuit 50 is applied by means of digital bus 51 to the input of a suitable digital interface circuit 53.

The resulting digital output data stream D produced a by SAR ADC 17 in FIG. 2 of the '406 published patent application is calibrated by subtracting the baseline values from it in order to generate $\Delta D$ as a stream of values of Cmij which are used to identify the precise location of a present finger touch on panel 13A. The "convolution" or combining introduced by the superposition of all of the touch screen panel row voltages onto any particular column conductor $3j$ then is "de-convoluted" by means of the de-convolution process which is associated with block 44.

The data generated by analog engine 15 represents a "data map" or panel topology map containing convoluted touch location data, one measurement at a time, for the entire touch panel 13A. The digital logic, which includes a finite state machine and/or a CPU in digital control circuit 38, arranges the successive data values in the desired order. That convoluted data map becomes de-convoluted by processing the data through de-convolution circuit 44. The de-convoluted data map can then be used to find the locations of the magnitude peaks and/or valleys.

The output generated on digital bus 58 by de-convolution block 44 in accordance with the de-convolution algorithm in block 44 represents a "magnitude map" of mutual capacitances of touch screen panel 13A indicating any present finger touches thereon. Touch detection circuit 50 in FIG. 4 performs a touch detection algorithm which searches the magnitude map for the largest magnitude peaks, over which the largest peak values of $\Delta Cmij$ occur when a touch is located directly over a mutual capacitance Cmij of touch screen panel 13A. As the finger touch moves away from this node, the magnitude of the corresponding peak will decrease and the magnitudes on other nodes will increase.

The left-hand matrix shown above analog engine 15 in FIG. 4 stores the results of transferring the 3q charge packets +q, −q, and 3q to provide the convoluted signals on the column conductors $3j$. The matrix calculations in the foregoing example are based on scanning the voltages of the column conductors $3j$.

Touch presence monitoring circuit 80 operates during a low-power "touch presence monitoring mode" to detect the presence of a valid touch on touch screen panel 13A. Touch presence monitoring circuitry 80 of touch screen controller 36-1 in FIG. 4 includes circuitry that compares the raw data $\Delta DATA$ (which is generated by analog engine 15 and algebraic summer 40 acting together) to a predetermined touch threshold and uses the comparison result to either cause touch controller 36-1 to be in its low-power touch presence monitoring mode if no valid touch is present or to start the full panel scanning mode previously described. More specifically, after calibrating the 6 voltage values of the 6 column conductors $3j$ (where $0<j<5$) under a "no touch" condition, those 6 calibrated values are subtracted from the column conductor voltages by means of algebraic summer 40 when a valid touch is present. Algebraic summer 40 subtracts the calibration values from the corresponding values of DATA so as to achieve the desired calibration, irrespective of whether touch screen controller is in its touch presence monitoring mode or its full panel scanning mode. The raw data $\Delta DATA$ coming out of algebraic summing circuit 40 during the touch presence scanning mode differs from the raw data coming out of analog engine 15 during the touch presence scanning mode in that $\Delta DATA$ is normalized to zero for a "no touch" condition. Above-mentioned proximity detection circuit 65 contains an implementation of the appropriate proximity detection algorithm, for example as indicated in the flowchart of FIG. 2 or FIG. 3. The $\Delta DATA$ information on bus 32B is connected to an input of proximity detection circuit 65. Proximity detection circuit 65 generates an output signal 66 indicating whether the approaching object is presently at an in-proximity location or an out-of-proximity location relative to the touch surface of touchscreen 13A.

Bus 32A, which is coupled to the output of algebraic summer 40, is coupled to the input port of a switching circuit 33A that functions like a single pole, double throw switch in order to route the information $\Delta DATA$ on bus 32A to either (1) the input of touch presence monitor 80 via bus 32B if touch screen controller 36-1 is in its low power touch presence monitoring mode, or (2) the input of de-convolution circuit 44 via bus 32C if touch screen controller 36-1 is in its high power full panel scanning mode.

The output generated on conductor/bus 81 of touch presence monitor 80 is provided as an input to digital control circuit 38 and also as an input to a switch circuit 33A that routes bus 32A to the input of de-convolution module 44 via bus 32C to cause the $\Delta DATA$ to be routed into de-convolution module 44 only during the full panel scan mode. Switch circuit 33A is configured so that $\Delta DATA$ does not go through the de-convolution process of de-convolution circuit 44 (which is powered down) during touch monitoring mode, and instead is routed via bus 32B to touch presence monitor 80. If a valid touch is detected by touch presence monitor 80, switching circuit 33A switches touch screen controller 36-1 from touch presence detecting mode into full panel scanning mode. (It should be appreciated that there are number of possibilities for accomplishing the function of switch circuit 33A. For example, an interrupt routine request (IRQ) to a system processor could be generated, or a full panel scanning mode operation could be initiated and then an IRQ could be asserted.)

The described embodiment of the invention uses the capacitive touch screen 13A itself (rather than the IR diode pair and associated circuitry required in the prior art) as a remote object proximity sensor. The self capacitance of the touch screen is used to increase touch screen sensitivity while the touch screen operates in its normal touch sensing mode and uses its mutual (or projective) capacitance when the touch screen operates in its remote object proximity detection mode. A Texas Instruments TSC 3060 low-power microcontroller may be used to implement touchscreen controller 36-1 and to store and execute the proximity detection algorithm of FIG. 2 using the $\Delta DATA$ information generated on bus 32B in touch screen controller 36-1 of FIG. 4 in order to determine the proximity of the relatively large, flat face/cheek of a user relative to the touch screen 13A of a smart phone or the like. The microcontroller may be operated at a substantially reduced speed and therefore with substantially reduced power consumption.

It should be appreciated that the deconvolution process is performed in the mutual-capacitive "active touch" mode when the previously described proximity algorithm is not being performed. The proximity algorithm operates during the self-capacitive "monitor mode" of the touch screen. It is helpful that these two modes are mutually exclusive, because the proximity test can be used to decide whether the device should enter into an "active touch" mode. Likewise, while the touchscreen controller chip is in "active touch" mode, it will never trigger the proximity state because the self-capacitance testing of the columns never happens in "active touch" mode.

To summarize, proximity-determining circuitry operates on digital signal changes representatives of changes in self-capacitance of one or more column conductors of the touch screen during the element proximity scanning to determine if the element is proximate to the touch screen, and also to determine if the element is a specific kind of element by comparing the digital signal changes to a predetermined data profile. Column conductor capacitances are also used for touch detection (in which self-capacitance of a row conductor with respect to ground potential is used to detect whether a touch is present) and to detect actual touch location and continuance of the presence of a previously detected touch using the mutual-capacitance between a column conductor and a row conductor. (In most cases, when a existence of an actual touch is detected by self-capacitance the location of that touch is tracked using mutual-capacitances until it the touching is removed, so there is no need to test for touch presence using self-capacitance once the presence of the touch has been established and is being tracked by means of the associated the mutual capacitance circuitry.)

While the invention has been described with reference to several particular embodiments thereof, those skilled in the art will be able to make various modifications to the described embodiments of the invention without departing from its true spirit and scope. It is intended that all elements or steps which are insubstantially different from those recited in the claims but perform substantially the same functions, respectively, in substantially the same way to achieve the same result as what is claimed are within the scope of the invention.

For example, as a practical matter, in some cases an approaching object having a predetermined frontal profile might be analyzed by means of a more general object-identifying process in which a determination is made as to whether the approaching object is a stylus that is charged positively on one end and negatively on the other. The touch screen could treat one end of the stylus as a pencil and the other end as an eraser.

What is claimed is:

1. A system comprising:
    a touch screen including columns of conductors, and
    touch screen controller circuitry coupled to the touch screen, the circuitry to:
        compare voltages of ones of a first set of the columns of conductors to a first threshold, ones of the columns of conductors to be included in the first set of the columns based on a level of noise associated with the system;
        based on comparison of the voltages of ones of the first set of the columns of conductors with the first threshold:
            identify a first one of the columns of conductors having a highest voltage; and
            compare the highest voltage to a second threshold;
        based on a comparison of the highest voltage to the second threshold, compare a difference between the highest voltage and a lowest voltage of the columns of conductors to a third threshold; and
        based on a comparison of the difference to the third threshold:
            determine the touch screen is within a threshold proximity of a face of a user; and
            change a setting of the system from an out-of-proximity state to an in-proximity state.

2. The system of claim 1, wherein the touch screen controller circuitry is disposed within a mobile phone and the touch screen controller circuitry is to operate at a sampling rate of less than 30 samples per second during proximity testing performed during an ongoing phone call.

3. The system of claim 1, wherein the touch screen controller circuitry is to reduce a sampling rate of a proximity detect circuitry of the touch screen controller circuitry.

4. The system of claim 1, wherein the touch screen controller circuitry is to introduce hysteresis to maintain the status as in-proximity when the touch screen is no longer in-proximity of the face for an amount of time before the touch screen controller circuitry changes the status to the out-of-proximity state.

5. A method to determine a proximity of a face of a user to a touch screen, the method comprising:
    when, as determined by touch screen controller circuitry, (i) voltages of ones of a first set of a plurality of columns of conductors of a touch screen are determined to meet a first threshold, and (ii) a highest voltage of a plurality of voltages corresponding respectively to ones of the plurality of columns of conductors is determined to meet a second threshold, performing, with the touch screen controller circuitry, a comparison of a difference between the highest voltage and a lowest voltage of the plurality of voltages to a third threshold, ones of the plurality of columns of conductors to be included in the first set of the plurality of columns of conductors based on a level of noise associated with the system;
    when the difference between the highest voltage and the lowest voltage meets the third threshold, determining the touch screen is within a threshold proximity of the face of the user; and
    changing a setting of the touch screen controller circuitry from an out-of-proximity state to an in-proximity state.

6. The method of claim 5, wherein the touch screen controller circuitry and the touch screen are disposed in a mobile phone and the method includes reducing a sampling rate of a proximity detect circuitry of the touch screen controller circuitry during an ongoing phone call.

7. The method of claim 5, wherein the method includes, causing the touch screen controller circuitry to operate at a sampling rate of less than 30 samples per second during proximity testing performed during an ongoing phone call.

8. The method of claim 5, further including, when the touch screen is no longer in-proximity of the face, maintaining the proximity status as in-proximity for a duration of time before changing the proximity status to the out-of-proximity state.

9. The method of claim 8, further including introducing hysteresis to maintain the status of the proximity testing circuit as in-proximity for the duration of time.

10. The method of claim 5, further including energizing the plurality of the columns of conductors.

\* \* \* \* \*